US007627550B1

(12) United States Patent
Adams et al.

(10) Patent No.: US 7,627,550 B1
(45) Date of Patent: *Dec. 1, 2009

(54) METHOD AND SYSTEM FOR COMPARING ATTRIBUTES SUCH AS PERSONAL NAMES

(75) Inventors: Norm Adams, Cave Creek, AZ (US); Scott Ellard, Marietta, GA (US); Scott Schumacher, Northridge, CA (US)

(73) Assignee: Initiate Systems, Inc., Chicago, IL (US)

( * ) Notice: Subject to any disclaimer, the term of this patent is extended or adjusted under 35 U.S.C. 154(b) by 231 days.

This patent is subject to a terminal disclaimer.

(21) Appl. No.: 11/522,223

(22) Filed: Sep. 15, 2006

(51) Int. Cl.
*G06F 7/00* (2006.01)
*G06F 17/30* (2006.01)
(52) U.S. Cl. .................. 707/2; 707/3; 707/4; 707/5; 707/6
(58) Field of Classification Search ................ None
See application file for complete search history.

(56) References Cited

U.S. PATENT DOCUMENTS

| 5,497,486 | A | | 3/1996 | Stolfo | |
|---|---|---|---|---|---|
| 5,710,916 | A | * | 1/1998 | Barbara et al. ................. | 707/9 |
| 6,662,180 | B1 | * | 12/2003 | Aref et al. ....................... | 707/6 |
| 6,842,761 | B2 | * | 1/2005 | Diamond et al. .......... | 707/104.1 |
| 7,099,857 | B2 | * | 8/2006 | Lambert ....................... | 706/55 |
| 7,143,091 | B2 | * | 11/2006 | Charnock et al. ............. | 707/5 |
| 7,155,427 | B1 | * | 12/2006 | Prothia et al. ................. | 707/3 |
| 2002/0099694 | A1 | * | 7/2002 | Diamond et al. .............. | 707/3 |
| 2003/0182101 | A1 | * | 9/2003 | Lambert ....................... | 704/1 |
| 2003/0195890 | A1 | * | 10/2003 | Oommen .................... | 707/100 |
| 2004/0107205 | A1 | * | 6/2004 | Burdick et al. .............. | 707/102 |
| 2004/0143508 | A1 | * | 7/2004 | Bohn et al. .................... | 705/26 |
| 2006/0080312 | A1 | * | 4/2006 | Friedlander et al. ............ | 707/5 |
| 2006/0179050 | A1 | * | 8/2006 | Giang et al. .................... | 707/5 |
| 2006/0195560 | A1 | * | 8/2006 | Newport ..................... | 709/223 |
| 2007/0005567 | A1 | * | 1/2007 | Hermansen et al. ............ | 707/3 |
| 2007/0067285 | A1 | * | 3/2007 | Blume et al. .................... | 707/5 |
| 2007/0150279 | A1 | * | 6/2007 | Gandhi et al. ............... | 704/258 |
| 2007/0198481 | A1 | * | 8/2007 | Hogue et al. ................... | 707/3 |
| 2007/0299697 | A1 | * | 12/2007 | Friedlander et al. ............ | 705/3 |
| 2008/0005106 | A1 | | 1/2008 | Schumacher et al. | |

OTHER PUBLICATIONS

Original Paper: "Record Linkage in the National Dose Registry of Canada" by M.E. Fair., pp. S37-S43.
Office Action issued in U.S. Appl. No. 11/521,928 filed Sep. 16, 2008, 14 pgs.

(Continued)

*Primary Examiner*—Mohammad Ali
*Assistant Examiner*—Angelica Ruiz
(74) *Attorney, Agent, or Firm*—Sprinkle IP Law Group

(57) ABSTRACT

Embodiments of systems and methods for comparing attributes of a data record are presented herein. Embodiments of the present invention generate a weight based on a comparison of attributes of data records. More specifically, embodiments of the present invention may compare each of the tokens of one name to each of the tokens of the other name. Each of these comparisons may generate a match score. These match scores can then be summed to generate the weight for the two names. Specific embodiments may adjust the weight based on various criteria such as the position of the tokens which match or subtracting a mismatch penalty.

23 Claims, 5 Drawing Sheets

OTHER PUBLICATIONS

Microsoft Dictionary, "normalize", at p. 20, Fifth Edition, Microsoft Corp., downloaded from http://proquest.safaribooksonline.com/ 0735614954 on Sep. 08, 2008, 29 pages.

Office Action issued in U.S. Appl. No. 11/521,928, mailed Apr. 1, 2009, Adams, 22 pages.

Notice of Allowance issued for U.S. Appl. No. 11/521,928, dated Sep. 18, 2009, 20 pp.

Oracel Data Hubs: "The Emperor Has no. Clothes?", Google.com, pp. 1-9. Feb. 21, 2005.

De Rose, et al. "Building Structured Web Community Portals: a top-Down, Compositional, and Incremental Approach", VDLB, ACM, pp. 399-410. Sep. 2007.

IEEE, no matched results, 1 page. Sep. 11, 2009.

\* cited by examiner

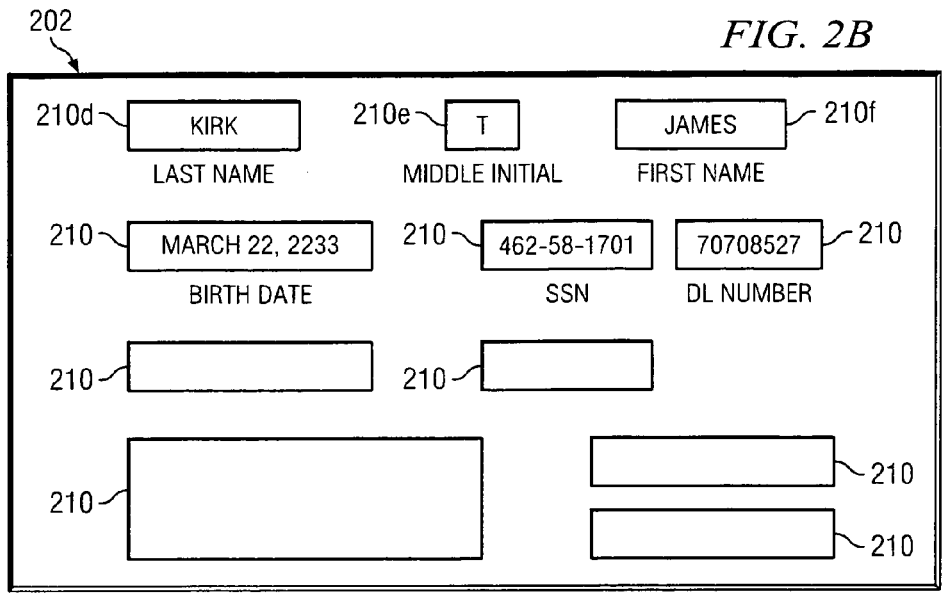
FIG. 2B
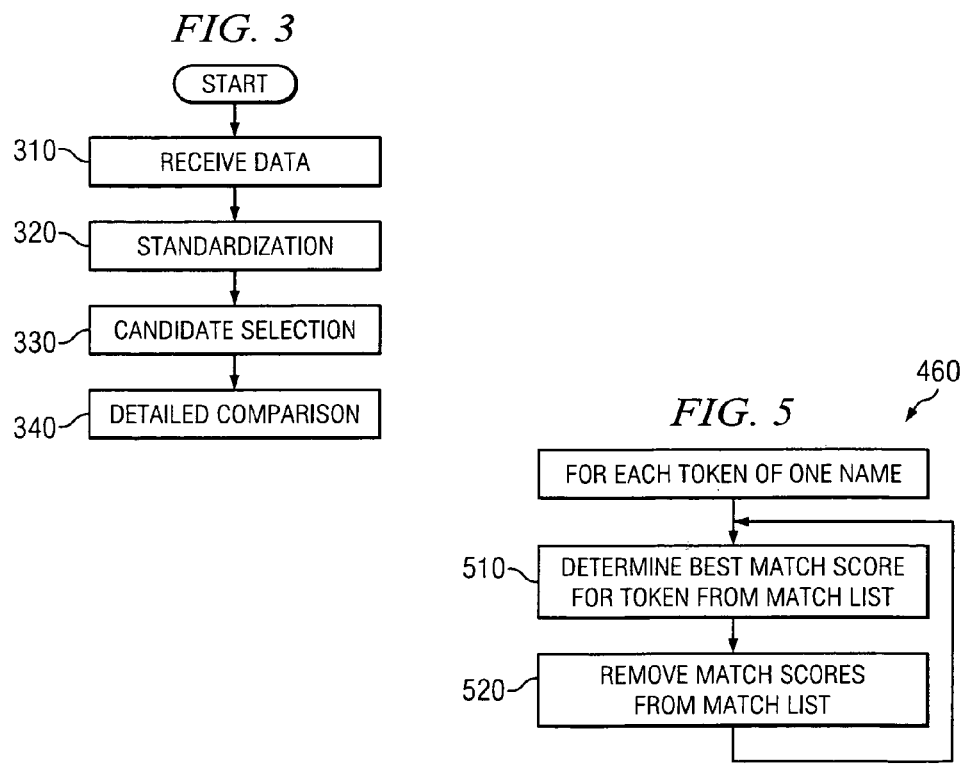

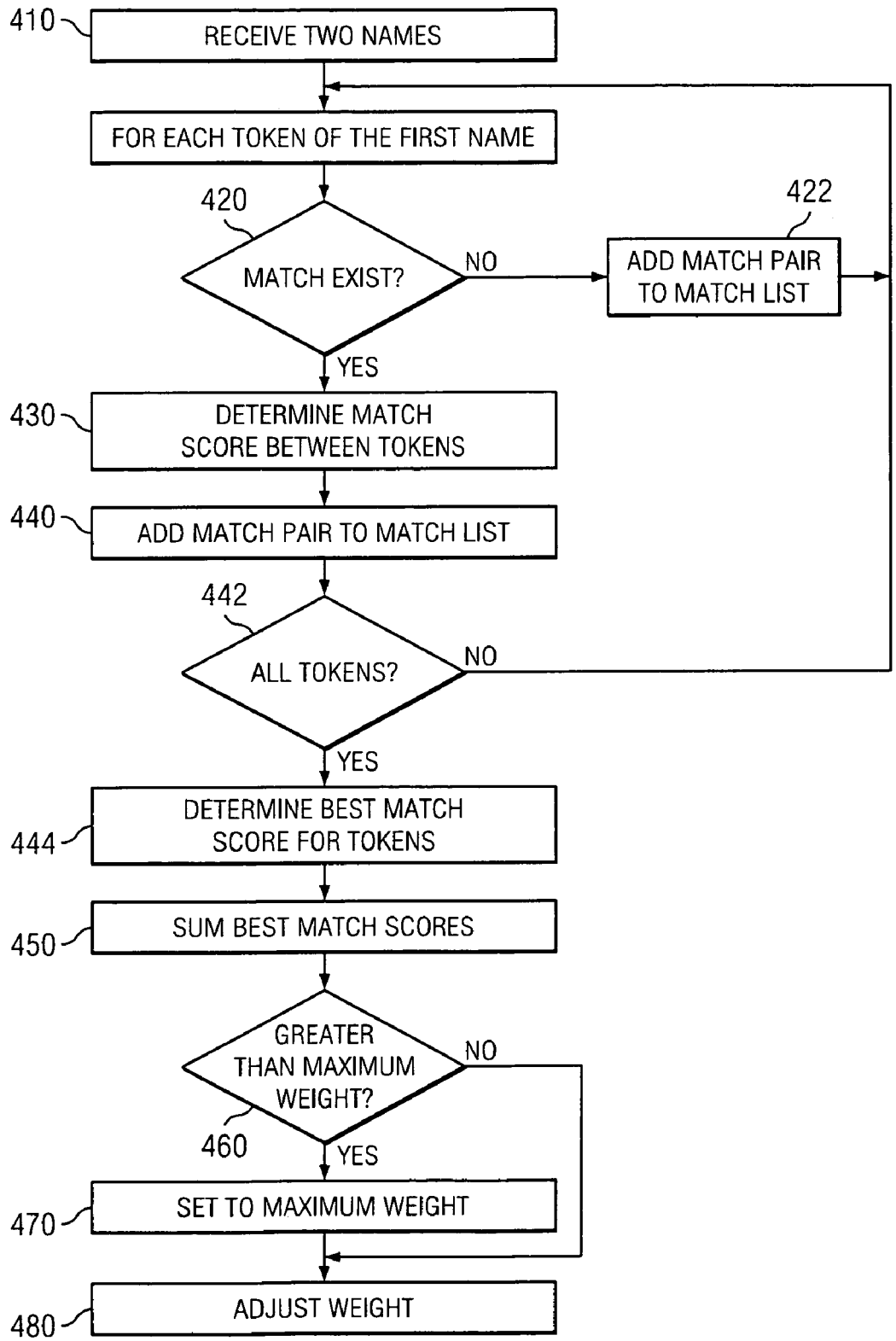

METHOD AND SYSTEM FOR COMPARING ATTRIBUTES SUCH AS PERSONAL NAMES

TECHNICAL FIELD OF THE INVENTION

This invention relates generally to associating data records, and in particular to identifying data records that may contain information about the same entity such that these data records may be associated. Even more particularly, this invention relates to the standardization and comparison of attributes within data records.

BACKGROUND OF THE INVENTION

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to other relevant pieces of data about the same entity. The databases also permit a person to query the database to find data records pertaining to a particular entity, such that data records from various data stores pertaining to the same entity may be associated with one another.

A data store, however, has several limitations which may limit the ability to find the correct data about an entity within the data store. The actual data within the data store is only as accurate as the person who entered the data, or an original data source. Thus, a mistake in the entry of the data into the data store may cause a search for data about an entity in the database to miss relevant data about the entity because, for example, a last name of a person was misspelled or a social security number was entered incorrectly, etc. A whole host of these types of problems may be imagined: two separate record for an entity that already has a record within the database may be created such that several data records may contain information about the same entity, but, for example, the names or identification numbers contained in the two data records may be different so that it may be difficult to associate the data records referring to the same entity with one other.

For a business that operates one or more data stores containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and prevent the, user from picking the wrong data record, it is also desirable to identify and associate data records from the various information sources that may contain information about the same entity. There are conventional systems that locate duplicate data records within a database and delete those duplicate data records, but these systems only locate data records which are identical to each other. Thus, these conventional systems cannot determine if two data records, with for example slightly different last names, nevertheless contain information about the same entity. In addition, these conventional systems do not attempt to index data records from a plurality of different information sources, locate data records within the one or more information sources containing information about the same entity, and link those data records together. Consequently, it would be desirable to be able to associate data records from a plurality of information sources which pertain to the same entity, despite discrepancies between attributes of these data records.

Thus, there is a need for system and methods for comparing attributes of data records which takes into account discrepancies between these attributes which may arise, and it is to this end that embodiments of the present invention are directed.

SUMMARY OF THE INVENTION

Embodiments of systems and methods for comparing attributes of a data record are presented herein. Broadly speaking, embodiments of the present invention generate a weight based on a comparison of the name (or other) attributes of data records. More particularly, embodiments of the present invention provide a set of code (e.g., a computer program product comprising a set of computer instructions stored on a computer readable medium and executable or translatable by a computer processor) translatable to compare each of the tokens of one name to each of the tokens of the other name. Each of these comparisons may generate a match score. These match scores can then be summed to generate the weight for the two names. Specific embodiments, may adjust the weight based on various criteria such as the position of the tokens which match or subtracting a mismatch penalty.

In one embodiment, if no match exists between a pair of tokens, a match pair a mismatch penalty may be associated with the pair of tokens as a match score.

In some embodiments, the types of matches may include exact matches, initial matches, phonetic matches, nickname matches, nickname-phonetic matches or edit distance matches.

In other embodiments a match score may be calculated based on the type of match between the two tokens using a penalty based on the type of the match.

Embodiments of the present invention may provide the technical advantage that attributes of the data records (and attributes in general) may be more effectively compared by allowing a weight to be generated by performing a whole host of comparisons on the tokens of the attributes. By more effectively comparing attributes of a data records, the comparison and linking of various data records may be more effective in taking into account a variety of real world conditions which may occur during the entering or processing of data records such as mistakes that may be made or difference which may occur when entering data, variations in capabilities or formats of different systems, changes in personal conditions such as changes of address, etc.

Other technical advantages of embodiments of the present invention include the variety of comparisons that may take place between the different tokens, including an exact match where tokens match exactly, a phonetic match where the tokens match phonetically, a nickname match to determine if either one of the tokens has a nickname that matches the others original value of if the tokens have a nickname in common or similarly if either of the tokens is a nickname-phonetic match of the other. The tokens may also be compared to determine if the edit distance between the two tokens is less than a certain distance (e.g. 20% of the longer of the two tokens) or if an initial token of one attribute matches a token of the other attribute.

Furthermore, a technical advantage may accrue in that tokens in the attributes which do not match may contribute negatively to the similarity scoring between the two tokens while if one attribute has additional tokens (i.e. more tokens than the other attribute) those tokens may not contribute to the scoring, increasing the accuracy of the similarity scoring between the two attributes.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 2A and 2B depict a representation of two embodiments of data records.

FIG. 3 depicts a flow diagram for one embodiment of comparing data records.

FIG. 4 depicts a flow diagram for one embodiment of a method for comparing attributes of a data record.

FIG. 5 depicts a flow diagram for one embodiment of a method for determining a best match for a set of tokens.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
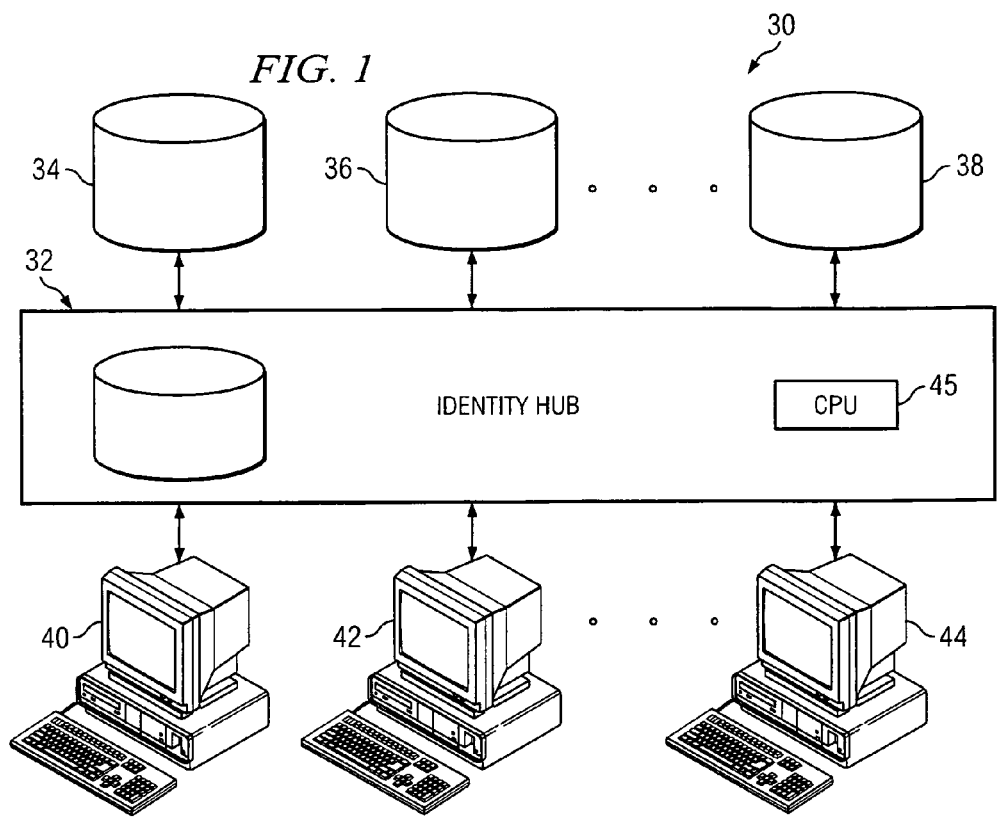
FIG. 1 depicts one embodiment of an example infrastructure.

Before turning to embodiments of the present invention, a general description of an example infrastructure or context which may be helpful in explaining these various embodiments will be described. A block diagram of one embodiment of just such an example infrastructure is described in FIG. 1. FIG. 1 is a block diagram illustrating one embodiment of an entity processing system 30 in accordance with embodiments of the invention. The entity processing system 30 may include an identity hub 32 that processes, updates or stores data pertaining to data records about one or more entities from one or more data sources 34, 36, 38 and responds to commands or queries from a plurality of operators 40, 42, 44, where the operators may be either users or information systems. The identity hub 32 may operate with data records from a single information source or, as shown, data records from multiple information sources. The entities tracked using the identity hub 32 may include for example, patients in a hospital, participants in a health care system, parts in a warehouse or any other entity that may have data records and information contained in data records associated with it. The identity hub 32 may be one or more computer systems with a central processing unit 45 executing computer readable instructions (e.g. a software application) that performs the function of the identity hub 32. The identity hub 32 may also be implemented using hardware circuitry.

As shown, the identity hub 32 may receive data records from the data sources 34, 36, 38 as well as write corrected data back into the information sources 34, 36, 38. The corrected data communicated to the data sources 34, 36, 38 may include information that was correct, but has changed, information about fixing information in a data record or information about links between data records.

In addition, one of the operators 40, 42, 44 may transmit a query to the identity hub 32 and receive a response to the query back from the identity hub 32. The one or more data sources 34, 36, 38 may be, for example, different databases that possibly have data records about the same entities. For example, in the health care field, each information source 34, 36, 38 may be associated with a particular hospital in a health care organization and the health care organization may use the identity hub 32 to relate the data records associated with the plurality of hospitals so that a data record for a patient in Los Angeles may be located when that same patient is on vacation and enters a hospital in New York. The identity hub 32 may be located at a central location and the data sources 34, 36, 38 and users 40, 42, 44 may be located remotely from the identity hub 32 and may be connected to the identity hub 32 by, for example, a communications link, such as the Internet or any other type communications network, such as a wide area network, intranet, wireless network, leased network, etc.

The identity hub 32 may have its own database that stores complete data records in the identity hub, or alternatively, the identity hub may also only contain sufficient data to identify a data record (e.g., an address in a particular data source 34, 36, 38) or any portion of the data fields that comprise a complete data record so that the identity hub 32 can retrieve the entire data record from the data source 34, 36, 38 when needed. The identity hub 32 may link data records together containing information about the same entity utilizing an entity identifier or an associative database separate from actual data records. Thus, the identity hub 32 may maintain links between data records in one or more data sources 34, 36, 38, but does not necessarily maintain a single uniform data record for an entity.

More specifically, the identity hub may link data records in data sources 34, 36, 38 by comparing a data record (received from an operator, or from a data source 34, 36, 38) with other data records in data sources 34, 36, 38 to identify data records which should be linked together. This identification process may entail a comparison of one or more of the attributes of the data records with like attributes of the other data records. For example, a name attribute associated with one record may be compared with the name of other data records, social security number may be compared with the social security number of another record, etc. In this manner, data records which should be linked may be identified.

It will be apparent to those of ordinary skill in the art, that both the data sources 34, 36, 38 and the operators 40, 42, 44 may be affiliated with similar or different organizations or owners. For example, data source 34 may be affiliated with a hospital in Los Angeles run by one health care network, while data source 36 may be affiliated with a hospital in New York run by another health care network. Thus, the data records of each of data sources may be of a different format.

Figure 2A:
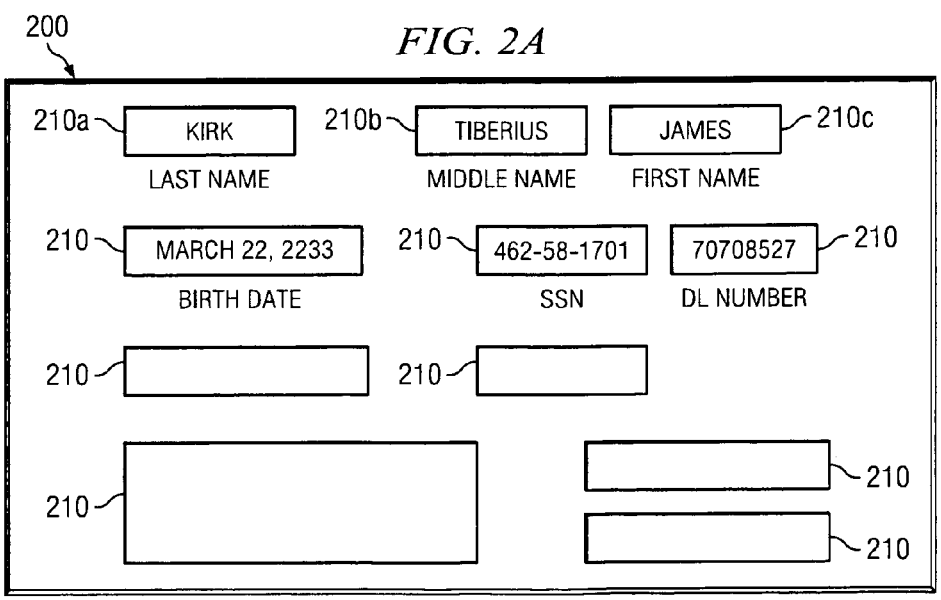

This may be illustrated more clearly with reference to FIGS. 2A and 2B, depicting two embodiments of example data records. Each of these data records 200, 202 has a set of fields 210 corresponding to a set of attributes of each of the data records. For example, one of the attributes of each of the records 200 may be a name, another attribute may be a social security number, etc. It will be apparent that an attribute may comprise multiple fields 210 of a data record 200, 202, for example, the name attribute of data record 200 may comprise fields 210a, 210b and 210c, the last, middle and first name fields, respectively.

Notice, however, that each of the records may have a different format, for example data record 202 may have a filed for the attribute of driver's license number, while data record 200 may have no such field. Similarly, like attributes may have different formats as well. For example, name fields 210a, 210b 210c in record 200 may accept the entry of a full first, last and middle name, while name fields 210d, 210e, 210f in record 202 may be designed for full first and last names, but only allow the entry of a middle initial.

As may be imagined, discrepancies such as this may be problematic when comparing two or more data records (e.g. attributes of data records) to identify data records which should be linked. The name "James T. Kirk" is not the same as "James Tiberius Kirk". Similarly, a typo or mistake in entering data for a data record may also affect the comparison of data records (e.g. comparing the name "James T. Kirk" with "Kames T. Kirk" where "Kames" resulted from a typo in entering the name "James").

To deal with these possibilities, a variety of name comparison techniques are utilized to generate a weight based on the comparison (e.g. similarity) of names in different records where this weight could then be utilized in determining whether two records should be linked, including various phonetic comparison methods, weighting based on frequency of name tokens, initial matches, nickname matches, etc. More specifically, the tokens of the name attribute of each record would be compared against one another, using methodologies to match the tokens including if the tokens matched exactly, phonetically, a token which may be an initial to a token which is a name or matching a nickname to a name token. These matches could then be given a score, based upon the determined match (e.g. an exact match was given one score, a certain type of initial match was given a certain score, etc.) These scores could then be aggregated to determine a weight for the degree of match between the name attribute of two data records.

These techniques were not without their various problems, however. In many cases the phonetic algorithm employed would not server to match name tokens where one token had a certain typo, certain ethnic names tended to score high because each of the tokens of the name was uncommon or had many tokens (and thus if the two attributes had a single token in common the frequency based score would be high). Consequently, match weights may be skewed. In fact, in some cases two name attributes which only partially match may receive a higher weight than two name attributes which match exactly. Thus, it would be desirable to utilize comparison algorithms which generate weights which better reflect the similarity between the name attributes of different records.

To that end, attention is now directed to systems and methods for comparing names. Broadly speaking, embodiments of the present invention generate a weight based on a comparison of the name attributes of data records. More specifically, embodiments of the present invention may compare each of the tokens of one name to each of the tokens of the other name to determine a match pair (e.g. two tokens and an associated score) for any matching tokens. These match pairs may then be refined to determine a set of best match pairs for each of the tokens and the scores of the best match pairs summed to generate the weight for the two names. Specific embodiments may adjust the weight based on various criteria, such as the position of the tokens which match or do not match.

To aid in an understanding of the systems and methods of the present invention it will be helpful to present an exemplary methodology for identifying records pertaining to the same entity which may utilize these systems and methods. FIG. 3 depicts one such embodiment. A set of data records for comparison may be given for evaluation at step 310. These data records may include, for example, one or more new data records to compare to a set of existing data records (which may already exist in, for example, data sources 34, 36, 38 or which may be provided as well). At step 320 the data records for comparison may be standardized. This standardization may comprise the tokenization of attributes of a data record into a standard format, such that subsequent comparisons between like attributes of different records may be performed according to this standard format. For example, the fields 210*a*, 210*b* 210*c* of the name attribute of data record 200 may be evaluated to produce a set of tokens for the name attribute (e.g. "James", "Tiberius" and "Kirk") and these tokens concatenated in accordance with a certain form to produce a standardized attribute (e.g. "James:Tiberius:Kirk" such that the standardized attribute may subsequently be parsed to generate the tokens which comprise the name attribute tokenized. It will be apparent that each of the attributes of the data records to be compared may be tokenized according to a different format, a different set of semantics or lexicon, etc.

Once the attributes of the data records to be compared have been standardized, a set of candidates may be selected to compare to the new data record at step 230. This candidate selection process may comprise a comparison of one or more attributes of the new data records to the existing data records to determine which of the existing new data records are similar enough to the new data records to entail further comparison. These candidates may then undergo a more detailed comparison to the new records where a set of attributes are compared between the records to determine if an existing data record should be linked or associated with the new data record. This more detailed comparison may entail comparing each of the set of attributes of one record (e.g. an existing record) to the corresponding attribute in the other record (e.g. the new record) to generate a weight for that attribute. The weights for the set of attributes may then be summed to generate an overall weight which can then be compared to a threshold to determine if the two records should be linked. Embodiments of methods and systems for comparing attributes are disclosed in U.S. patent application Ser. No. 11/521,928 titled "Method and System For Comparing Attributes Such as Business Names" by Norm Adams et al filed on Sep. 15, 2006 which is fully incorporated herein by reference.

Turning now to FIG. 4, a flow diagram for another embodiment of a method for generating a weight through a name comparison is depicted. Though the embodiment of the methodology depicted may be used to compare any two attributes (e.g. personal names, addresses, company names, etc.) it may useful in comparing personal names, and will be described as such.

At step 410 two names are given or provided (e.g. input to a software application) such that these names may be compared. The names may each be in a standardized form comprising a set of tokens, as discussed above with respect to FIG. 3. Each of the tokens in one of the names may be compared to each of the tokens in the other name to determine for each pair if a match exists between the tokens at step 420 and, if so, the match score for that pair of tokens is determined at step 430 and added to a match list comprising an ordered (e.g. by score) list of two tokens and an associated score at step 440 (e.g. a match pair). If no match exists between the two tokens, a match pair comprising the two tokens and a mismatch penalty (e.g. match score for a mismatch) may be added to the match list. Once each of the tokens of the names has been compared and the match list determined (step 442), the match list is evaluated to determine a best match pair for each of the tokens of the first name if it exists at step 444.

At step 450, then, these best match scores (e.g. score associated with a best match pair) are summed to produce a weight which is then checked at step 460 to see if it is greater than a maximum weight (which may be determined based on a particular data set or otherwise configurable). If the weight is greater than the maximum weight the weight may be set to the maximum weight at step 470. The weight may then be adjusted at step 480 for a variety of factors. For example, the weight may be first be adjusted positively based on positional matches of the tokens (e.g. an exact positional match, where two tokens appear at a similar position in their respective name attributes, adjusts the weight upward by a certain amount (e.g. 0.2), a partial positional match adjusts the score upward by another lesser amount, etc.) or other criteria, and then the weight may be adjusted negatively based on any criteria (e.g. any mismatch penalty imposed based on tokens within the names which do not have a match).

It may be helpful to elucidate the steps of FIG. 4 more clearly. To that end, FIG. 5 depicts one embodiment of a methodology for determining a best match score (if it exists) between two tokens (step 460). After a match list has been established, where the match list comprises pairs of tokens, one token from each of the names being compared and a match score determined for those two tokens, a best match can be determined for a token at 460. Determining a best match for the tokens of one of the names may comprise, for each of the tokens of the name, processing the match list at step 510 to determine the match pair comprising that token which has the highest score. This match pair is the best match pair for that token. Then, at step 520, each of the match pairs which comprise any of the tokens of the determined best match pair is removed from the match list before a best match pair is determined for the next token. In this manner, a best match pair may be determined for each of the tokens of a name if a best match pair for that token exists. In one embodiment, this process may be facilitated by ordering the match list by score.

Figure 6:
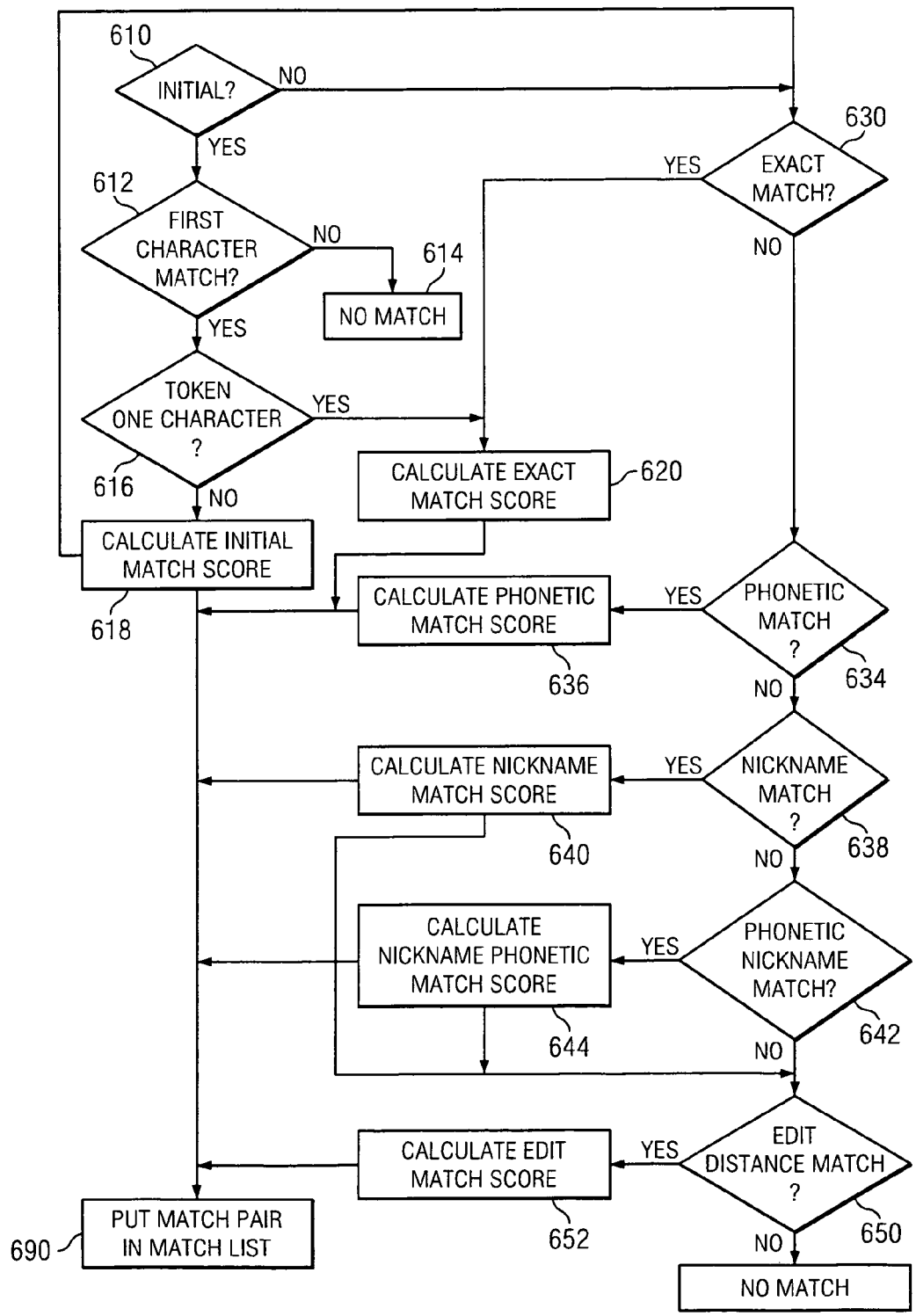
FIG. 6 depicts a flow diagram for one embodiment of a method for matching tokens.

It is probably useful, here, to illustrate in more detail how a match score may be determined for a pair of tokens. FIG. 6 depicts a flow diagram for one embodiment of a method for determining match pairs for a token (e.g. a pair of tokens with an associated score) if one or more match pairs for the token exists. To determine match pairs for a token of one of the names being compared the token is compared to each of the tokens of the other name being compared.

For each of these token to token comparisons it is determined at step 610 if one or both of the tokens is an initial (e.g. single alphanumeric character). If one of the tokens is an initial it is then determined if the first characters of the two tokens are identical at step 612. If they are not identical, there is no match between these two tokens (step 614) and the token from the first name may be compared to another token of the second name, if any tokens of the second name which have not yet been compared to the token of the first name exist. Additionally, if no match exists the two tokens and a mismatch penalty entered into the match list (which may be an alternative in any case where no match exists between two tokens). If however, the tokens are identical, it is then determined if one of the strings is longer than a single character at step 616. If they are both single characters an exact match score may be calculated for the pair of tokens at step 620 and the two tokens and associated match score may be entered into the match list at step 690. If however, one token is not a single character an initial match score may be calculated for the pair of tokens at step 618 and the two tokens and associated match score may be entered into the match list at step 690.

Returning to step 610, if neither of the tokens being compared is an initial or if there is an initial match at step 618, it is determined at step 630 if the two tokens match exactly. If they do an exact match score may be calculated for the pair of tokens at step 620 and the two tokens and associated match score may be entered into the match list at step 690. If, however, the two tokens do not match exactly it may be determined at step 634 if the two tokens match phonetically. This phonetic match determination may be accomplished through the use of various encoding or comparison schemes as are known in the art (e.g. metaphone, NYSIIS, etc.), some combination of these comparison schemes, proprietary methods, or almost any other method for phonetic comparison.

If, at step 634, a phonetic match is found a phonetic match score may be calculated for the pair of tokens at step 636, the two tokens and associated match score may be entered into the match list at step 690, before it is determined if a nickname match exists at step 638. A nickname match may be determined at step 638 by referencing a set of nicknames associated with one of the tokens and comparing each of these nicknames to the other token and vice versa. Additionally, a nickname match may be determined by comparing the set of nicknames associated with each of the tokens to determine if any of the set of nicknames associated with each of the tokens are the same. These nicknames may, for example, be stored in the database associated with identity hub 30.

If a nickname match occurs at step 638 a nickname match score may be calculated for the pair of tokens at step 640 and the two tokens and associated match score may be entered into the match list at step 690 before determining if an edit distance match occurs at step 650. If it is determined at step 638 that no nickname match occurs between the two tokens, it may then be determined if a nickname-phonetic match occurs between the two tokens at step 642. This nickname-phonetic match may be determined similarly to determining a nickname match, here a set of nicknames associated with one of the tokens may be phonetically compared to the other token and vice versa. Additionally, a nickname-phonetic match may be determined by phonetically comparing the set of nicknames associated with each of the tokens to determine if any of the set of nicknames associated with each of the tokens phonetically match one another.

If a nickname-phonetic match occurs at step 642 a nickname-phonetic match score may be calculated for the pair of tokens at step 644 and the two tokens and associated match score may be entered into the match list at step 690 before determining if an edit distance match occurs at step 650. If it is determined at step 642 that no nickname-phonetic match occurs between the two tokens, it may then be determined if an edit distance match occurs between the two tokens at step 650. If an edit distance match occurs at step 650 an edit distance match score may be calculated for the pair of tokens at step 652 and the two tokens and associated match score may be entered into the match list at step 690. If it is determined at step 650 that no edit match occurs between the two tokens, it may be determined that the two tokens do not match at step 654 and the token from the first name may then be compared to another token of the second name if necessary.

To determine whether there is an edit distance match between two tokens at step 650, an edit distance may be determined for the two tokens (e.g. how many changes to one token would it take to produce the other token) and if this edit distance is within a certain threshold an edit distance match exists between the two tokens. In one embodiment, the edit distance may be a Levenshtein distance or a Damerau-Levenshtein distance (e.g. where a transposition is counted as a single edit operation) and the threshold level is approximately 20% of the length of the longest token being compared. Thus, if the edit distance between the two tokens is shorter than about 20% of the longest token (e.g. edit distance of 1, longest token is 6 characters), it may be determined at step 650 that an edit distance match exists between two tokens.

From FIG. 6 it may be seen that a different match score may be calculated for two tokens depending on the type (if any) of match which exists between two tokens, (e.g. exact match, phonetic match, nickname match, nickname-phonetic match or edit distance match). It may be useful to describe embodiments of how these match scores are calculated. In one embodiment, an exact match weight table may have weight values for an exact match. In other words, the exact match weight table may comprise a list of tokens with a corresponding weight value. This weight value may correspond to an exact match score. Put a different way, if both tokens being compared are the same, the token may be located in the exact match weight table and the corresponding weight is used as the match score for those two tokens. If two tokens are determined to be an exact match and the token is not in the exact match weight table, a default weight value may be utilized for the match score.

In one embodiment, the weights associated with the tokens in the exact match weight table may be calculated from a sample set of data record, such as a set of data records associated with one or more of data sources 34, 36, 38 or a set of provided data records. Using the sample set of data records exact match weights may be computed using frequency data and match set data. The number of name strings (e.g. name attributes) $Name_{Tot}$ in the sample set of data records may be computed, and for each name token T corresponding to these name strings a count: $T_{count}$ and a frequency $T_{freq}=T_{count}/Name_{Tot}$.

The tokens are then ordered by frequency with the highest frequency tokens first and a cumulative frequency for each token which is the sum of the frequencies for the token and all those that came before it is computed as depicted in Table 1:

TABLE 1

| Token | Freq | Cumulative Freq |
|---|---|---|
| $T_0$ | $T_{freq-0}$ | $T_{freq-0}$ |
| $T_1$ | $T_{freq-1}$ | $T_{freq-0} + T_{freq-1}$ |
| $T_2$ | $T_{freq-2}$ | $T_{freq-0} + T_{freq-1} + T_{freq-2}$ |
| ... | ... | ... |
| $T_N$ | $T_{freq-N}$ | $T_{freq-0} + \ldots + T_{freq-N}$ |

This computation may also use the computed matched probability (as described more thoroughly below):

$$MatchProb_{Exact} = Match_{Exact}/Match_{Comp}.$$

All tokens up to and including the first token whose cumulative frequency exceeds 0.50 are ten determined and for each of these tokens compute the exact match weight may be computed using the formula:

$$Exact_{Ti} = \log_{10}(MatchProb_{Exact}/T_{freq-i})$$

If $T_M$ is the first token whose cumulative frequency exceeds 0.50 and $T_N$ is the last token or the lowest frequency token the default exact match weight can be computed by taking the average of $\log_{10}(MatchProb_{Exact}/T_{freq-M+1})$, ..., $\log_{10}(MatchProb_{Exact}/T_{freq-N})$.

Figure 7:
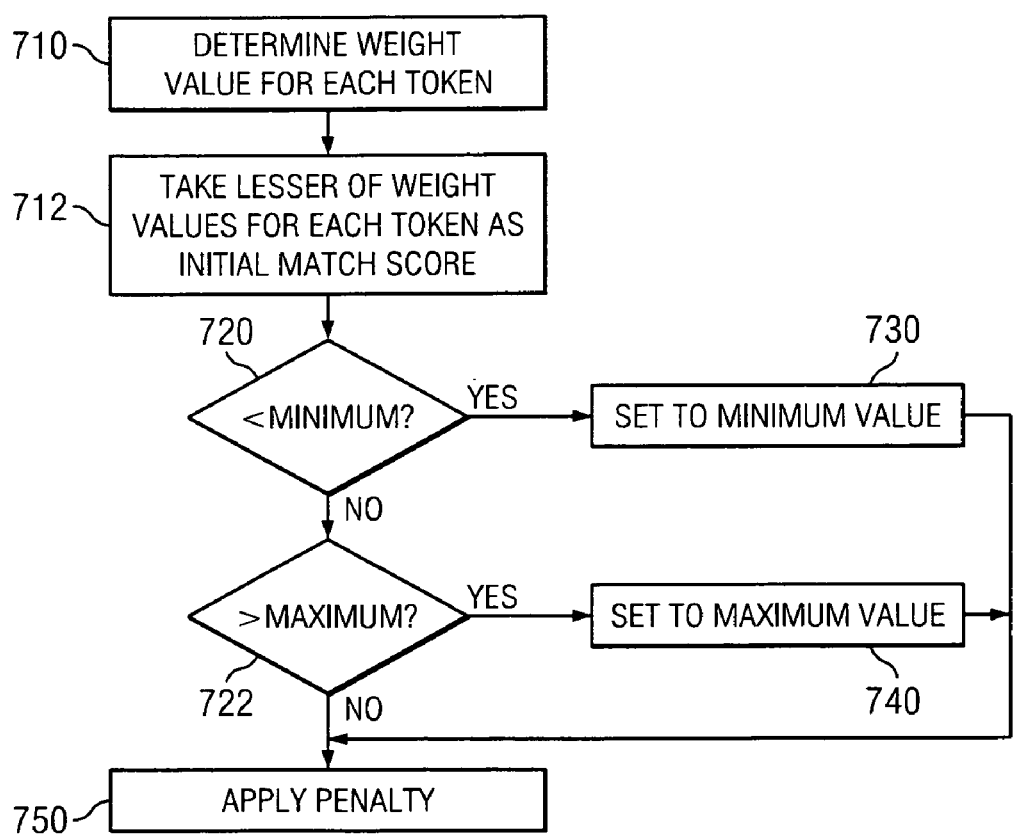
FIG. 7 depicts a flow diagram for one embodiment of a method for determining a match score for a match pair.

Using the computed exact match weight table (which may have been computed previously and stored in a database associated with identity hub 30) then, match scores may then be calculated for other types of matches (e.g. phonetic match, nickname match, nickname-phonetic match or edit distance match). FIG. 7 depicts a flow diagram for one embodiment of a method for generating match scores for matches other than exact matches. At step 710, when a match is determined to exist between two tokens, the exact match weight value for both tokens is determined by reference to the exact match weight table. The lesser weight value is then taken as an initial match score for the two tokens at step 712. This initial match score is then compared to minimum and maximum weight values associated with the type of match that exists between the two tokens at steps 720 and 722, respectively (e.g. in calculating a match score for a nickname match a nickname minimum weight and a nickname maximum weight may be used, a phonetic minimum weight and a phonetic maximum weight may be used in calculating a match score for a phonetic match, etc.). If the initial match score is below the minimum it is set to the minimum value at step 730 and if the initial match score is greater than the maximum value it is set to the maximum value at step 740. A penalty is then applied to the initial match score to determine the match score for the pair of tokens at step 750. Again, the penalty applied may depend on the type of match that exists between the two tokens (e.g. in calculating a match score for a nickname match a nickname penalty may be used while a phonetic penalty may be used in calculating a match score for a phonetic match, etc.). The respective values for the minimum weight values, maximum weight values and penalties for each type of match may be found in one or more tables associated with identity hub 30.

The various minimums, maximums and penalties used in conjunction with any type of match may be configured differently based on the type of match. For example, a different minimum weight, maximum weight or penalty may be utilized in calculating a match score for a nickname match than may be used in calculating the match score for a phonetic match, while the minimum weight, maximum weight or penalty utilized in calculating a match score for a phonetic match may in turn be different than those used in calculating the match score for a nickname-phonetic match, etc.

These values for each of the respective minimums, maximums and penalties for each type of match may be configured manually or may be calculated according to a variety of algorithms. In one embodiment, to calculate these penalties an embodiment of a compare algorithm such as that described with respect to FIG. 4 is applied to a set of random pairs of names obtained from a sample set of data records. Typically around 10 million pairs of names may be used. While applying the compare algorithm the following may be tracked:

$Ran_{Comp}$=The total number of name tokens that are compared.

$Ran_{Exact}$=The total number of name tokens that agree exactly.

$Ran_{Initial}$=The total number of name tokens that agree via an initial match. An initial match is one in which the first characters agree, one token has length 1 and the other's length is greater than 1.

$Ran_{Phonetic}$=The total number of name tokens that agree phonetically, not exactly.

$Ran_{Nickname}$=The total number of name tokens that have a common nickname, and don't match Exactly.

$Ran_{NickPhone}$=The total number of name tokens that have nicknames that match phonetically and don't match Exactly or via a Nickname alone $Ran_{Edit}$=The total number of name tokens that match via an edit distance compare and do not match exactly.

The following frequencies can then be computed:

$RanProb_{Exact}=Ran_{Exact}/Ran_{Comp}$
$RanProb_{Initial}=Ran_{Initial}/Ran_{Comp}$
$RanProb_{Phonetic}=Ran_{Phonetic}/Ran_{Comp}$
$RanProb_{Nickname}=Ran_{Nickname}/Ran_{Comp}$
$RanProb_{NickPhone}=Ran_{NickPhone}/Ran_{Comp}$
$RanProb_{Edit}=Ran_{Edit}/Ran_{Comp}$ Using the process described above in conjunction with generating exact match weights, a set of matched name pairs can be derived, and the following frequencies derived:

$MatchProb_{Exact}=Match_{Exact}/Match_{Comp}$
$MatchProb_{Initial}=Match_{Initial}/Match_{Comp}$
$MatchProb_{Phonetic}=Match_{Phonetic}/Match_{Comp}$
$MatchProb_{Nickname}=Match_{Nickname}/Match_{Comp}$
$MatchProb_{NickPhone}=Match_{NickPhone}/Match_{Comp}$
$MatchProb_{Edit}=Match_{Edit}/Match_{Comp}$ Using these frequencies the following marginal weights may be computed:

$Marginal_{Exact}=\log_{10}(MatchProb_{Exact}/RanProb_{Exact})$
$Marginal_{Initial}=\log_{10}(MatchProb_{Initial}/RanProb_{Initial})$
$Marginal_{Phonetic}=\log_{10}(MatchProb_{Phonetic}/RanProb_{Phonetic})$
$Marginal_{Nickname}=\log_{10}(MatchProb_{Nickname}/RanProb_{Nickname})$
$Marginal_{NickPhone}=\log_{10}(MatchProb_{NickPhone}/RanProb_{NickPhone})$
$Marginal_{Edit}=\log_{10}(MatchProb_{Edit}/RanProb_{Edit})$ and the respective penalties computed as follows:

Initial Penalty=$Marginal_{Exact}$−$Marginal_{Initial}$
Initial Penalty=$Marginal_{Exact}$−$Marginal_{Initial}$
Phonetic Penalty=$Marginal_{Exact}$−$Marginal_{Phonetic}$
Nickname Penalty=$Marginal_{Exact}$−$Marginal_{Nickname}$
NickPhone Penalty=$Marginal_{Exact}$−$Marginal_{NickPhone}$
Edit Distance Penalty=$Marginal_{Exact}$−$Marginal_{Edit}$ An example of the application of one embodiment of a method for comparing names such as that depicted in FIG. 4 to a pair of actual names is now presented to further aid in an understanding of embodiments of the systems and methods of the present invention.

Assume that the exact match weights are as follows:

JONES 2.48
BOB 3.55
ROBERT 1.87
R 1.68
J 1.47

Now assume that the nickname penalty is 1.23 and the initial penalty is 2.22 and the name "Jones, Bob R." is being compared to the name "Jones, Robert J." Start with JONES in first list. Since, the first compare results in an exact match, the comparison of "JONES" may stop. Neither JONES token may be compared again. "BOB" may then be compared to the remaining tokens, and "R" to the remaining token. The list of comparisons and associated scores may be as follows:

JONES—JONES, wgt=+2.68, Exact Match
BOB—ROBERT, wgt=+0.84, Nickname Match
BOB—J, wgt=−0.58, Mismatch
R—ROBERT, wgt=+0.60, Initial Match
R—J, wgt=−0.58, Mismatch This list ordered by score (e.g. a best match list) may be as follows:

JONES—JONES, wgt=+2.68, Exact Match
BOB—ROBERT, wgt=+0.84, Nickname Match
R—ROBERT, wgt=+0.60, Initial Match
BOB—J, wgt=−0.58, Mismatch
R—J, wgt=−0.58, Mismatch The steps for determining the best match pairs from the match list may be as follows: the first pair on the list is JONES—JONES, so this is our first matched pairs. The second pair is BOB—ROBERT. It is checked that neither token has been used yet and neither has, so now the set of best match pairs looks like:

JONES—JONES, wgt=+2.68, Exact Match
BOB—ROBERT, wgt=+0.84, Nickname Match

The next match pair in the match list is R—ROBERT. But since ROBERT has already been utilized in a previously selected best match pair this match pair will be discarded. Next is the match pair BOB and J. Again, the token BOB has been used in a selected best match pair. Next is the match pair R—J neither of which has been used, thus this match pair is selected as the best match pair for the token "R". So the final set of best match pairs selected from the match list are:

JONES—JONES, wgt=+2.68, Exact Match
BOB—ROBERT, wgt=+0.84, Nickname Match
R—J, wgt=−0.58, Mismatch Thus, to determine a final weight for the comparison of these names, the positive values (2.68 and 0.84) are summed and any negative values (−0.58) are applied, yielding a final weight for the comparison of 2.94.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for comparing attributes, comprising: providing a system having an identity hub coupled to a set of data sources and a set of operator computers via a network, wherein the identity hub is configured to store a link between one or more data records in the set of data sources;

receiving, at the identity hub, a first attribute from one of the set of data sources or from one of the set of operators, wherein the first attribute is associated with a first data record in a first data source of the set of data sources, the first data record representing a first entity;

receiving, at the identity hub, a second attribute associated with a second data record in a second data source of the set of data sources, the second data record representing a second entity;

comparing, at the identity hub, each of a set of tokens of the first attribute to each of a set of tokens of a second attribute to determine if a match exists between each pair of tokens;

if a match exists, determining, at the identity hub, a match score for each pair of tokens to form a match pair for the pair of tokens and adding the match pair to a match list;

determining, at the identity hub, a best match pair for each of the set of tokens of the first attribute from the match list by determining a match pair comprising the token having the highest score;

generating, at the identity hub, a weight between the two attributes, wherein generating the weight comprises summing a score of each of the best match pairs; and determining if the first data record and the second data record should be linked based at least in part on the weight between the two attributes and if it is determined that the first data records and the second data record should be linked, establishing a link at the identity hub between the first data record in the first data source and the second data record in the second data source, wherein the link indicates that the first entity represented by the first data record in the first data source is the same as the second entity represented by the second data record in the second data source.

2. The method of claim 1, further comprising: if no match exists between the pair of tokens, forming a match pair from the pair of tokens and a mismatch penalty and adding the match pair to the match list.

3. The method of claim 2, wherein determining if a match exists comprises determining if there is an exact match, an initial match, a phonetic match, a nickname match, a nickname-phonetic match or an edit distance match.

4. The method of claim 3, wherein determining a match score for a pair comprises, determining a first exact match weight for a first token of the pair of tokens and using the exact match weight as the match score if the there is an exact match and, if there is not an exact match, determining the first exact match weight for the first token of the pair and a second exact match weight for the second token of the pair, taking the lesser of the first exact match weight and the second exact match weight as an initial match score and applying a penalty to the initial match score to generate the match score.

5. The method of claim 4, wherein the penalty applied is based on the type of the match.

6. The method of claim 2, wherein determining a best match pair comprises, for each token of the first attribute, finding a first match pair in the match list, wherein the first match pair comprises the token and the first match pair has a higher score than any other match pair in the match list.

7. The method of claim 6, wherein the match pair comprises the token and a second token and determining a best match pair further comprises removing each match pair in the match list comprising the first token or a second token of the first match pair.

8. The method of claim 6, further comprising comparing the weight with a maximum weight and if the weight is greater than the maximum weight setting the weight to the maximum weight.

9. The method of claim 8, wherein summing the score of each of the best match pairs comprises summing the positive scores before summing the negative scores.

10. The method of claim 9, further comprising adjusting the weight based on an exact positional match between a first token of the first attribute and a second token of the second attribute.

11. The method of claim 10, wherein the weight is adjusted before the negative scores are summed.

12. A tangible computer readable medium, comprising computer instructions translatable for executing, at an identity hub coupled to a set of data sources and a set of operator computers via a network, wherein the identity hub is configured to store a link between one or more data records in the set of data sources, the steps of:

receiving, at the identity hub, a first attribute from one of the set of data sources or from one of the set of operators, wherein the first attribute is associated with a first data record in a first data source of the set of data sources, the first data record representing a first entity;

receiving, at the identity hub, a second attribute associated with a second data record in a second data source of the set of data sources, the second data record representing a second entity;

comparing, at the identity hub, each of a set of tokens of the first attribute to each of a set of tokens of a second attribute to determine if a match exists between each pair of tokens;

if a match exists, determining, at the identity hub, a match score for each pair of tokens to form a match pair for the pair of tokens and adding the match pair to a match list;

determining, at the identity hub, a best match pair for each of the set of tokens of the first attribute from the match list by determining a match pair comprising the token having the highest score;

generating, at the identity hub, a weight between the two attributes, wherein generating the weight comprises summing a score of each of the best match pairs; and determining if the first data record and the second data record should be linked based at least in part on the weight between the two attributes and if it is determined that the first data records and the second data record should be linked, establishing a link at the identity hub between the first data record in the first data source and the second data record in the second data source, wherein the link indicates that the first entity represented by the first data record in the first data source is the same as the second entity represented by the second data record in the second data source.

13. The computer readable medium of claim 12, the instructions translatable for: if no match exists between the pair of tokens, forming a match pair from the pair of tokens and a mismatch penalty and adding the match pair to the match list.

14. The computer readable medium of claim 13, wherein determining if a match exists comprises determining if there is an exact match, an initial match, a phonetic match, a nickname match, a nickname-phonetic match or an edit distance match.

15. The computer readable medium of claim 14, wherein determining a match score for a pair comprises, determining a first exact match weight for a first token of the pair of tokens and using the exact match weight as the match score if the there is an exact match and, if there is not an exact match, determining the first exact match weight for the first token of the pair and a second exact match weight for the second token of the pair, taking the lesser of the first exact match weight and the second exact match weight as an initial match score and applying a penalty to the initial match score to generate the match score.

16. The computer readable medium of claim 15, wherein the penalty applied is based on the type of the match.

17. The computer readable medium of claim 13, wherein determining a best match pair comprises, for each token of the first attribute, finding a first match pair in the match list, wherein the first match pair comprises the token and the first match pair has a higher score than any other match pair in the match list.

18. The computer readable medium of claim 17, wherein the match pair comprises the token and a second token and determining a best match pair further comprises removing each match pair in the match list comprising the first token or a second token of the first match pair.

19. The computer readable medium of claim 17, the instructions translatable for: comparing the weight with a maximum weight and if the weight is greater than the maximum weight setting the weight to the maximum weight.

20. The computer readable medium of claim 19, wherein summing the score of each of the best match pairs comprises summing the positive scores before summing the negative scores.

21. The computer readable medium of claim 20, the instructions translatable for adjusting the weight based on an exact positional match between a first token of the first attribute and a second token of the second attribute.

22. The computer readable medium of claim 21, wherein the weight is adjusted before the negative scores are summed.

23. A system for computing attributes, comprising:

a set of operator computers;

a set of data sources, each data source storing one or more data records; and an identity hub coupled to the set of data source and the set of operator computers via a network, the identity hub configured to store links between one or more data records in the set of data sources, wherein the identity hub, comprises a tangible computer readable medium comprising instructions executable by a processor for:

receiving a first attribute from one of the set of data sources or form one of the set of operators, wherein the first attribute is associated with a first data record in a first data source of the set of data sources, the first data record representing a first entity;

receiving, at the identity hub, a second attribute associated with a second data record in a second data source of the set of data sources, the second data record representing a second entity, comparing each of a set of tokens of the first attribute to each of a set of tokens of a second attribute to determine if a match exists between each pair of tokens, if a match exists, determining a match score for each pair of tokens to form a match pair for the pair of tokens and adding the match pair to a match list, determining a best match pair for each of the set of tokens of the first attribute from the match list by determining a match pair comprising the token having the highest score, generating a weight between the two attributes, wherein generating the weight comprises summing a score of each of the best match pairs, and determining if the first data record and the second data record should be linked based at least in part on the weight between the two attributes and if it is determined that the first data records and the second data record should be linked, establishing a link at the identity hub between the first data record in the first data source and the second data record in the second data source, wherein the link indicates that the first entity represented by the first data record in the first data source is the same as the second entity represented by the second data record in the second data source.

* * * * *

UNITED STATES PATENT AND TRADEMARK OFFICE
CERTIFICATE OF CORRECTION

| | | |
|---|---|---|
| PATENT NO. | : 7,627,550 B1 | Page 1 of 1 |
| APPLICATION NO. | : 11/522223 | |
| DATED | : December 1, 2009 | |
| INVENTOR(S) | : Norm Adams et al. | |

It is certified that error appears in the above-identified patent and that said Letters Patent is hereby corrected as shown below:

On the front page of the patent, in the Abstract, line 11, replace "match or subtracting" with -- match or subtract --;

Column 1, line 38, replace "record for an" with -- records for an --;
Column 2, line 25, replace "the, user" with -- the user --;
        line 62, replace "embodiments, may" with -- embodiments may --;
        line 66, delete "a match pair";
Column 3, line 13, replace "of a data records" with -- of data records --;
        line 27, replace "value of if" with -- value or if --;
Column 4, line 60, replace "the information sources" with -- the data sources --;
Column 5, line 3, replace "each information source" with -- each data source --;
        line 11, replace "and users 40" with -- and operators 40 --;
        line 62, replace "have a filed" with -- have a field --;
Column 6, line 32, replace "not server to" with -- not serve to --;
Column 7, line 16, replace "230" with -- 330 --;
Column 9, line 20, replace "30" with -- 32 --;
Column 10, line 47, replace "are ten determined" with -- are then determined --;
        line 60, replace "30" with -- 32 --;
Column 11, line 23, replace "30" with -- 32 --.

Signed and Sealed this
Twenty-third Day of August, 2011

David J. Kappos
*Director of the United States Patent and Trademark Office*